US005232646A

United States Patent [19]

Nasvik et al.

[11] Patent Number: 5,232,646

[45] Date of Patent: Aug. 3, 1993

[54] METHODS OF FORMING CONTOURED WALLS

[75] Inventors: Peter A. Nasvik, West St. Paul, Minn.; Paul C. Nasvik, Hudson, Wis.

[73] Assignee: Concrete Design Specialties, Inc., St. Paul, Minn.

[21] Appl. No.: 611,179

[22] Filed: Nov. 7, 1990

[51] Int. Cl.[5] ........................ B28B 1/16; B28B 11/06; B29C 39/12; E04B 1/16

[52] U.S. Cl. ........................ 264/133; 249/16; 249/35; 249/55; 249/99; 249/102; 249/104; 249/112; 249/140; 264/33; 264/34; 264/35; 264/131; 264/219; 264/225; 264/245; 264/254; 264/255; 264/256; 264/259; 264/316; 264/338

[58] Field of Search ........................ 264/31-35, 264/245, 255, 259, 313, 316, 338, 133, 219, 225, 254, 256, 131; 249/16, 55, 99, 102, 104, 112, 140, 35

[56] References Cited

U.S. PATENT DOCUMENTS

| | | | |
|---|---|---|---|
| Re. 29,945 | 3/1979 | Scott . | |
| 787,665 | 4/1905 | Deeds et al. . | |
| 1,491,205 | 4/1924 | Ford . | |
| 1,636,396 | 7/1927 | Urschel | 249/39 |
| 1,712,678 | 5/1929 | Redman | 249/16 |
| 1,776,999 | 9/1930 | Jensen . | |
| 1,937,306 | 11/1933 | Barriball . | |
| 2,474,654 | 6/1949 | Carlson | 264/256 X |
| 2,513,648 | 7/1950 | Iezzi . | |
| 2,616,145 | 11/1952 | Dufford . | |
| 2,629,135 | 2/1953 | Johnson | 249/140 |
| 2,689,381 | 9/1954 | Terriere | 249/140 |
| 3,002,322 | 10/1961 | Dorsett | 249/16 X |
| 3,177,279 | 4/1965 | Bilodeau | 264/255 |
| 3,307,822 | 3/1967 | Stout . | |
| 3,334,570 | 10/1967 | Marson . | |
| 3,566,572 | 3/1971 | Wilkinson | 264/35 X |
| 3,584,826 | 6/1971 | Liester | 249/35 |
| 3,950,477 | 4/1976 | Di Giacomo | 264/354 X |
| 3,954,377 | 5/1976 | Scholz et al. | 249/112 X |
| 4,116,415 | 9/1978 | Ward . | |
| 4,131,406 | 12/1978 | Fresquez | 404/93 X |
| 4,135,840 | 1/1979 | Puccini et al. | 404/93 |
| 4,150,808 | 4/1979 | Sawyer . | |
| 4,159,097 | 6/1979 | Strickland . | |
| 4,407,480 | 10/1983 | Trimmer et al. . | |
| 4,555,088 | 11/1985 | Chang . | |

FOREIGN PATENT DOCUMENTS

| | | | |
|---|---|---|---|
| 450070 | 7/1948 | Canada | 249/140 |
| 1101365 | 10/1955 | France | 249/16 |
| 158825 | 9/1984 | Japan | 249/16 |
| 214662 | 8/1989 | Japan | 249/16 |

OTHER PUBLICATIONS

Article entitled "Concrete Form Construction", pp. 47-76, labelled Exhibit AA.

Brochure entitled "Custom Rock Creations", dated May 1988, 4 pages, labelled Exhibit BB.

(List continued on next page.)

*Primary Examiner*—Karen Aftergut

*Attorney, Agent, or Firm*—Merchant, Gould, Smith, Edell, Welter & Schmidt

[57] ABSTRACT

The present invention is a contoured wall and method for creating the contour and appearance of a wall formed from individual assembled units such as stones. The wall is formed from a plurality of interlocking wall portions that each have at least two non-linear mating surfaces. Each of the wall portions further has a lateral face contoured to resemble the stone wall. The wall is formed from hardenable construction material such as concrete poured between two mold members. Each of the mold members has a lateral mold face with at least one of the lateral faces having a plurality of interlocking contoured relief portions to provide a molded surface having the contour of a stone wall. In one embodiment, at least one of the mold members includes a plurality of individual form liners, or mold modules, each of which includes two non-linear mating edges and a lateral relief mold face.

21 Claims, 3 Drawing Sheets

OTHER PUBLICATIONS

A Reinforced Earth Company brochure, entitled, "Family of Construction Technologies", 8 pages, copyright 1990, labelled Exhibit A.

A Reinforced Earth Company brochure, entitled "An Advanced Construction Technology", 8 pages, copyright 1990, labelled Exhibit B.

A Reinforced Earth Company document, entitled "Standard and Custom Finishes Make Reinforced Earth ® Structures Attractive as Well as Functional", 1 page, copyright 1989, labelled Exhibit C.

Bomanite ® Corporation brochure, entitled, "The Network For Concrete Innovation", 4 pages, dated 1989, labelled Exhibit A.

Bomanite ® Corporation brochure, entitled, "Bomacron ® Patterns", Bomanite Patterns, and Bomanite Guideline Specification, 4 pages, dated 1989, labelled Exhibit B.

METHODS OF FORMING CONTOURED WALLS

FIELD OF THE INVENTION

The present invention relates generally to walls made from hardenable construction materials, such as concrete, having at least one contoured face. In particular, the present invention relates to concrete walls contoured to have the appearance of a stone wall.

BACKGROUND OF THE INVENTION

In the past, walls have been constructed from individual units such as stones, rocks, blocks, or bricks which are assembled into the shape of a wall and held together with a bonding substance, such as mortar.

One problem with a wall of this type is that they are typically expensive and time consuming to construct. One alternative type of wall involves constructing a wall from a hardenable construction material, such as poured concrete. Concrete walls of this type may be constructed so that the face of the wall is substantially smooth. A concrete wall may also be textured, thereby having the appearance of a wall formed from a plurality of individual assembled units, such as bricks. U.S. Pat. No. 3,307,822 (the '822 patent) illustrates one example of constructing a vertical wall from concrete creating the appearance of a wall formed from individual bricks. The '822 patent also illustrates a technique of providing a vertical concrete wall with a contoured surface by pouring the concrete wall between mold members that leave behind a contour on one or more of the lateral faces of the wall once the concrete hardens.

Additional techniques are known in the construction industry for creating concrete surfaces with textures and patterns. In the past, horizontal concrete surfaces, such as roads, sidewalks, and floors, have been provided with textured surfaces, for example, by stamping a contour into the concrete before it hardens. Vertical concrete walls have also been provided with textured surfaces by adding a desired texture to a surface through veneering, wherein another material is adhered to the exterior surface of the concrete wall.

One problem that arises when pouring a hardenable construction material between mold members to create a vertical concrete wall having the contour of a wall formed from individual units is the problem of part lines or seam lines being formed through the portions of the wall that resemble the individual units. For example, individual bricks, or other units, will have a seam through the middle of the brick, thus making it apparent that the bricks are not real bricks. Seam lines result at the intersection of two mold members, used to form a portion of a continuous concrete wall. Seam lines detract from the appearance of the wall, and reduce the natural looking qualities of the concrete wall. Seam lines may be removed through sanding, but this requires an extra step during the construction process, and may result in the sanded portions having a different texture than the surrounding concrete.

A further problem arises in trying to simulate natural rock of randomly sized and/or shaped units, intended to resemble a natural stone wall. When it is desired to have a natural looking concrete wall that appears to be formed from a plurality of non-linear and/or non-uniform units, the concrete wall may not appear natural if a repeating pattern is easily visible. Such a problem does not exist in forming a brick wall where all bricks have the same dimensions. The ability to easily and inexpensively create the appearance of a nonrepeating pattern in a stone wall has been a significant concern in the construction industry.

It is clear that a long and unfilled need has existed in the art for a system for more easily and inexpensively forming walls with one or more contoured faces, that resemble individual assembled building units. In addition, there is a need for a system for use in more easily creating a concrete wall with one or more faces that more naturally resembles a wall formed from individual non-linear and/or non-uniform building units, such as stones. The present invention solves these and other problems associated with the prior art.

SUMMARY OF THE INVENTION

The present invention relates to a method of forming a wall having the contour and appearance of a natural stone wall. A first pair of mold members, which each include a lateral mold face, are provided. At least one of the lateral mold faces is a lateral relief mold face that comprises a plurality of interlocking contoured relief portions, adapted to provide a molded surface having the contour of a stone wall. The mold members are secured such that the lateral mold faces face one another, preferably substantially parallel to one another, at a distance equal to the desired thickness of the wall. A molding cavity between the mold members is defined by securing the edges between the mold faces, as necessary. The cavity is filled with a hardenable construction material, such as concrete, and the hardenable construction material is allowed to set. The mold members are removed from the set construction material leaving a wall portion that has at least one lateral face having the contour and appearance of a stone wall formed from the lateral relief mold face. The wall portion further has first and second non-linear mating surfaces on opposite sides of the lateral face. The method of forming the wall further includes repeating the process described above with a second pair of mold members placed in interlocking relationship with the previously formed non-linear mating surfaces of the wall portion.

A second method of forming a wall having the contour of a stone wall includes combining more than one mold module together to form a larger mold member, or gang form mold member, prior to using the mold member to mold a section of a wall. A plurality of mold modules are provided, each having lateral mold faces, comprising a plurality of interlocking contoured relief portions that are adapted to provide a molded surface having the contour of a stone wall. The mold modules are first assembled to form the gang form mold member or first mold member. A second mold member, that includes either a planar face, or a contoured face like the first mold member, is used to define the mold cavity. The second method employs substantially the same steps as the first method described for pouring the wall between the first and second mold members. The resulting wall has integrally and simultaneously formed wall portions instead of successively formed wall portions as described above for the first method.

The present invention also includes a third method of forming a wall having the contour of a stone wall wherein a plurality of individual wall portions are separately pre-cast between mold members in accordance with some of the steps of the first method such that each pre-cast wall portion is movable to a desired location for assembly into a wall. The third method includes the step of assembling the wall portions by interlocking the non-linear surfaces of each wall portion to form a continuous wall.

The present invention also relates to a contoured wall wherein the wall includes a plurality of interlocking wall portions. The wall portions each include a pair of non-linear mating surfaces. First and second lateral faces are provided on each wall portion and at least one of the lateral faces has a plurality of contoured relief portions interlocking so as to give the appearance of a stone wall. Each of the non-linear mating surfaces interlocks with a reciprocal non-linear mating surface on an adjacent wall portion. The non-linear mating surfaces comprise a plurality of surface portions, pairs of which meet to form grooves that are adapted to mate securely with a reciprocal pair of surface portions on an adjacent wall portion. The wall portions also include a top surface and a bottom surface that may be linear or non-linear.

The adjacent wall portions are preferably integrally and simultaneously formed. In an alternative embodiment, a plurality of wall portions are successively formed with a first wall portion formed in position and each successive wall portion formed successively in position in interlocking relationship with the previously formed wall portion. In a further alternative embodiment, each wall portion may be pre-cast separately and assembled to form the wall.

The present invention also relates to a form liner for use in forming a wall having a stone wall contour wherein the form liner includes a lateral relief mold face having a plurality of contoured relief portions interlocking so as to provide a molded surface with the appearance of a stone wall. The form liner also includes a top edge and a bottom edge. A pair of non-linear mating edges is provided on the form liner, extending from the top edge to the bottom edge. The top and bottom edge may also include non-linear mating edges. The mating edges are adapted to be interlocked with a reciprocal non-linear mating edge of an adjacent second form liner also having a lateral relief mold face with the plurality of interlocking contoured relief portions.

BRIEF DESCRIPTION OF THE DRAWINGS

In the drawings, wherein like reference numerals generally indicate corresponding parts throughout the several views.

DETAILED DESCRIPTION OF THE PREFERRED EMBODIMENTS

Figure 1:
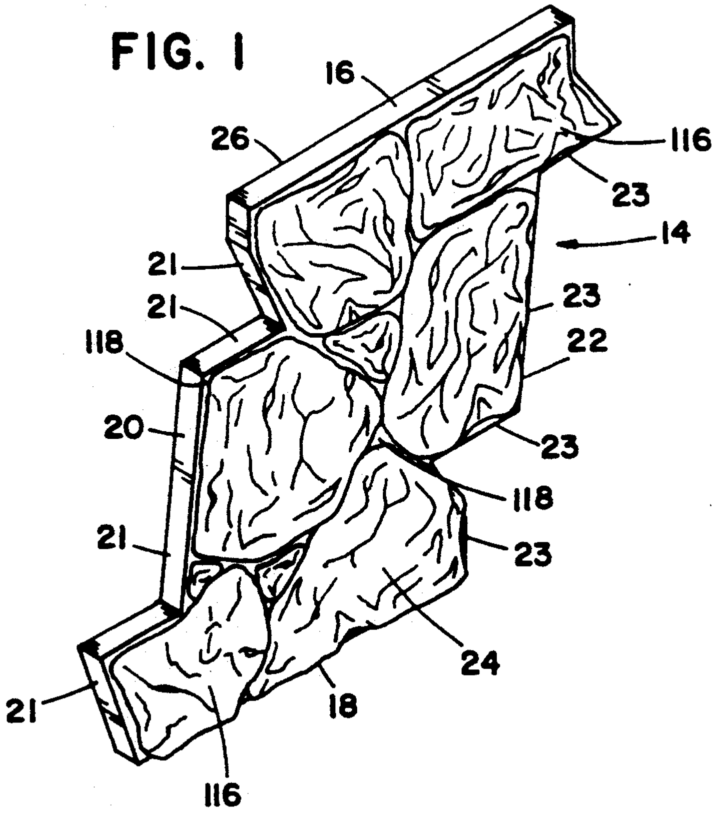
FIG. 1 is a perspective view of a wall portion having the appearance of a stone wall.

Referring now to FIG. 1, an integrally formed wall portion 14 is shown according to the principles of the present invention. The wall portion 14 is formed with a lateral face 24 having the contour of a wall formed from individual stones. A second lateral face 26 opposite lateral face 24 may also be provided with a contoured surface. The lateral face 24 has a contour that resembles a stone wall with stone-like units 116 and mortar-like portions 118. In the embodiment shown, the stone-like portions 116 are not rectangular or uniform to create the appearance of a natural looking wall formed from individual natural stones.

The wall portion 14 is preferably formed from a hardenable construction material that sets to form a rigid structure. Preferably, the hardenable construction material includes cement. In the preferred embodiment, the construction material is concrete containing cement, sand and gravel.

A first mating surface 20 and a second mating surface 22 of wall portion 14 extend along sides of the lateral face 24. First mating surface 20 and second mating surface 22 are located along mortar-like portions 118 of wall portion 14. The wall portion 14 is shaped so that the first mating surface 20 and the second mating surface 22 are adapted to be interlocked with an adjacent wall portion or portions having reciprocal mating surfaces to mating surfaces 20, 22. In this manner, a continuous wall can be formed from a plurality of wall portions 14. The resulting wall more naturally resembles a stone wall since the mating surfaces 20, 22 interlock and mate in regions of the wall that do not form the stone-like portions 116. Instead, the mating regions are located in the mortar-like portions 118 of the wall portion 14. The mating surfaces 20 and 22 include a plurality of substantially planar mating segments 21 and 23.

In the preferred embodiment, the first mating surface 20 of each wall portion 14 is the reciprocal image of its second mating surface 22. A plurality of identical wall portions 14 may be provided to interlock with one another to form the wall. Further, in the preferred embodiment, the first mating surface 20 may be mated with the first mating surface 20 of a second wall portion 14 that has been rotated, or inverted in the embodiment shown in FIG. 1, about an axis generally perpendicular to the lateral face 24. If a plurality of wall portions are provided, some with different patterns to the lateral faces, the wall portions may be arranged and interlocked to form a continuous wall where any repeating patterns in the placement of the wall portions used to form the wall are not easily visible.

In the preferred embodiment, the wall portion 14 shown in FIG. 1 has a top surface 16 and a bottom surface 18 which are generally parallel to one another. Typically, the bottom surface 18 engages the ground and supports the wall portion 14 when in the vertical orientation shown. The top surface 16 forms the top of the wall. In the alternative, the top surface 16 may provide a base for supporting a second wall portion (not shown) or a ledge member (not shown). It should be appreciated that wall portion 14 may be inverted such that top surface 16 engages the ground and the bottom surface 18 forms the top of the wall. It should further be appreciated that other embodiments are contemplated wherein the wall portions have a different number of linear sides than are shown in the Figures. In some applications, it may be possible to structure each wall portion to have a perimeter defined completely by non-linear edges or surfaces. In that case, each wall portion may be interlocked with more than two adjacent wall portions, for example, three or four.

Figure 2:
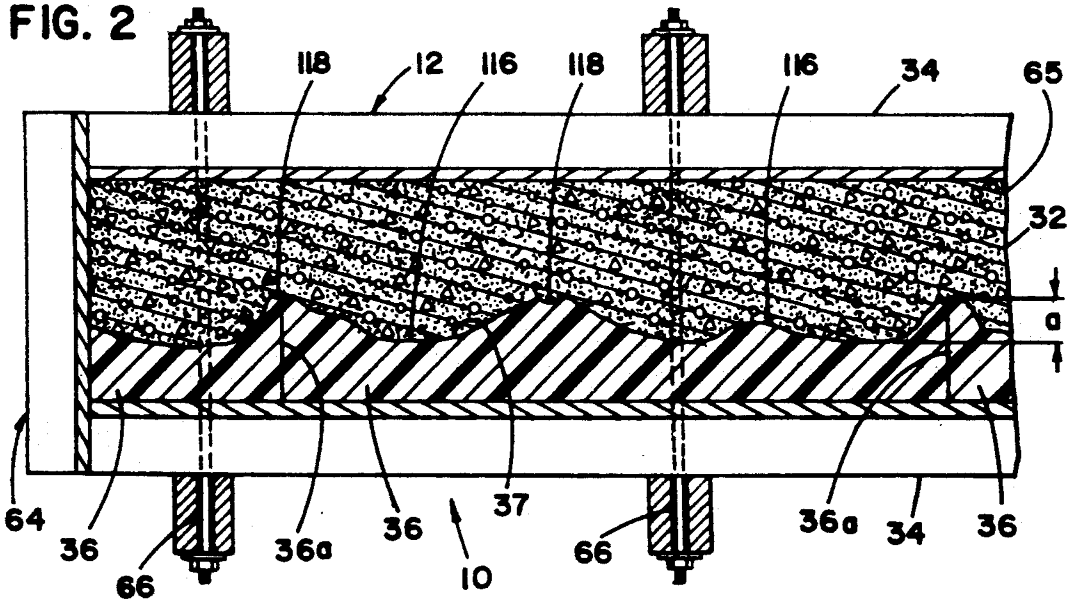
FIG. 2 is a top view in cross-section of two mold members forming a wall between the mold members.

Referring now to FIG. 2, a method is illustrated for forming a wall having the contour of a stone wall. FIG. 2 illustrates a technique of integrally and simultaneously forming a plurality of wall portions 14 from a hardenable construction material, such as concrete, poured between a first mold member 10 and a second mold member 12. In FIG. 2, the first mold member 10 consists of a form 34 with a plurality of form liners, or mold modules 36, secured to the form 34. The form liners 36 are each provided with a lateral relief mold face 37 which has a negative relief contour representing the reciprocal image of the pattern and texture of the desired molded wall.

Form 34 may be made of a variety of materials including planar members, for example, plywood, and elongate members, for example, wood boards and metal bars (not shown). The form liners 36 are attached to the form 34 in interlocking or mating relationship with adjacent form liners 36. As will be discussed below in greater detail, joints 36*a* between the form liners 36 may produce seam lines in the molded wall. However, any seam lines are located in mortar-like portions 118 of the wall and, therefore, are not easily visible. The relief mold face varies in profile by a distance designated "a" in FIG. 2. The present invention provides a method by which the profile can vary sufficiently to provide the contour of a natural stone wall.

To form a wall according to the method shown in FIG. 2, mold member 10 and second mold member 12 are first positioned generally parallel to each other at a distance equal to the desired thickness of the wall. If the wall is designed so as to not have a uniform thickness, the mold members could be positioned at the appropriate relative angles to achieve this design. The first mold member 10 and the second mold member 12 are secured. End forms 64 are added to both of the ends of the mold members 10, 12 to form a molding cavity 65 for receiving poured hardenable construction material, such as concrete. In FIG. 2, only one end form 64 is shown, however, the opposite end form could be substantially similar to the one shown.

Ties 66 are employed to maintain the appropriate distance between the first and second mold members 10, 12. Ties 66 could be any of a variety of known structures which function to properly position and affix the mold members. The ties may be a threaded rod with nuts (shown in FIG. 2) or "snap-ties" that hold the mold members together until the construction material is hardened and then are snapped off below the outer surface of the wall to remove the mold members.

After the cavity 65 is created between the first and second mold members 10, 12 and the end forms 64, concrete 32, or some other suitable hardenable construction material, is poured into the cavity 65. The concrete 32 fills the cavity 65 and has an outer surface formed by the mold members 10, 12, and end forms 64. The concrete is permitted to set, or harden, and the mold members 10, 12 and end forms 64, are removed. The hardened concrete 32 forms a concrete wall with one face having the contour of a stone wall formed from the lateral relief mold faces 37 of the form liners 36. In the preferred embodiment, the form liners 36 and form 34 are intended to be reusable.

Once the first mold member 10 and second mold member 12 are removed from the hardened concrete, surface colors, pigments, or stains, such as chemical stains, pigmented sealers, and latex or acrylic paints, may be added to the surface of the concrete to further create the appearance a natural stone wall 32. It is to be appreciated that the concrete used to form the walls may be integrally colored with various pigments or coloring agents. Some grinding and/or filling of surface defects that are common to poured-in-place concrete walls may be necessary. It is anticipated that the concrete chosen to form the wall could be any of a wide variety of known concretes containing cement and aggregates such as sand and gravel. In particular, Type I and Type III concrete, which are commonly used in the construction industry, may be used in the present case. Other hardenable construction materials may also be utilized in the method of the present invention.

As shown in FIG. 2, the form liners 36 are attached to the form 34 to form the first mold member 10. Form liner 36 could also be formed integrally with form 34. The form liners 36 may also be provided as part of second mold member 12 to provide a concrete wall with both lateral faces molded to have the contour of a stone wall.

FIG. 2 generally represents one method of forming the concrete wall formed from a plurality of wall portions 14. It is to be appreciated that some of the techniques illustrated in FIG. 2 are also applicable to forming a wall made from single wall portions 14 formed successively in abutting relationship instead of simultaneously. In that case, a first wall portion is formed from first and second mold members 10, 12. A second mating wall portion 14 is formed after the first wall portion is hardened and the first mold member 10 and second mold member 12 are removed. In this manner, a continuous wall may be formed from two mold members that form a single wall portion 14 at a time. Alternatively, a plurality of wall portions 14 may be formed independently of each other and assembled on-site into a continuous wall as a type of prefabricated or pre-cast construction technique.

Figure 5:
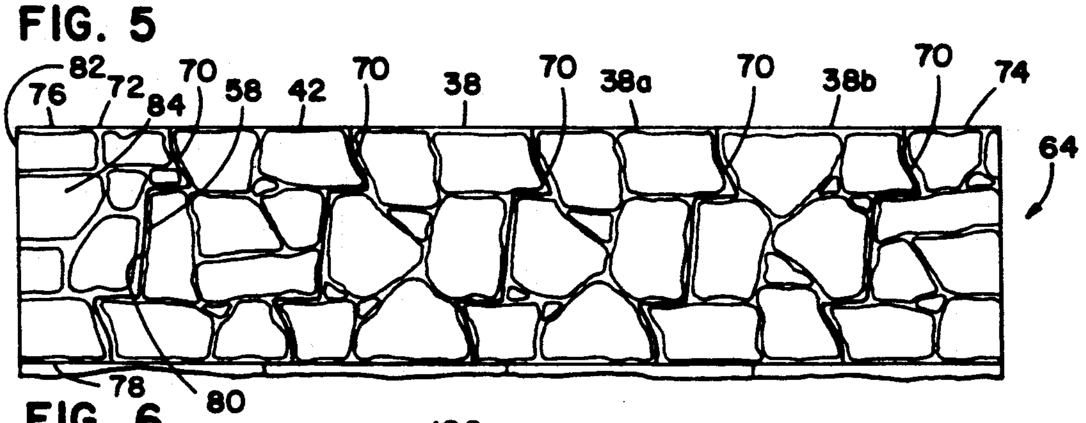
FIG. 5 is a front view of a gang form mold member including a plurality of individual mating form liners of the type shown in FIGS. 3 and 4.
Figure 6:
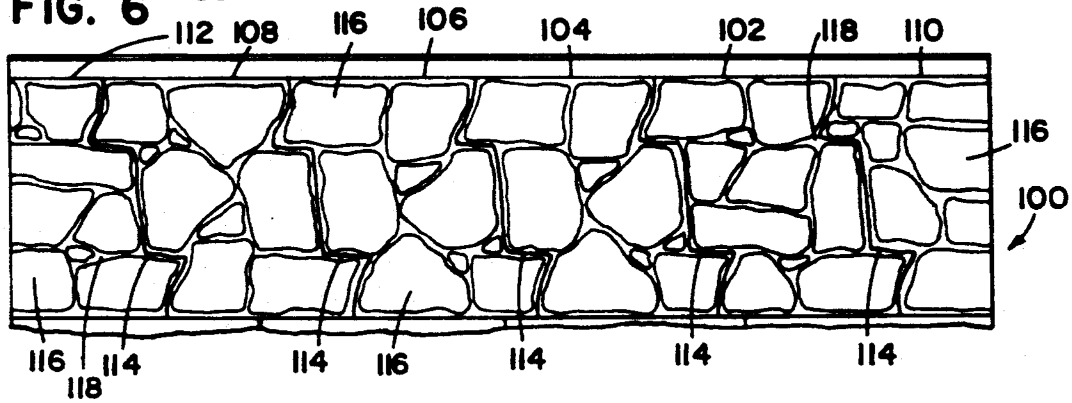
FIG. 6 is a front view of a wall formed from the gang form mold member shown in FIG. 5.
Figure 3:
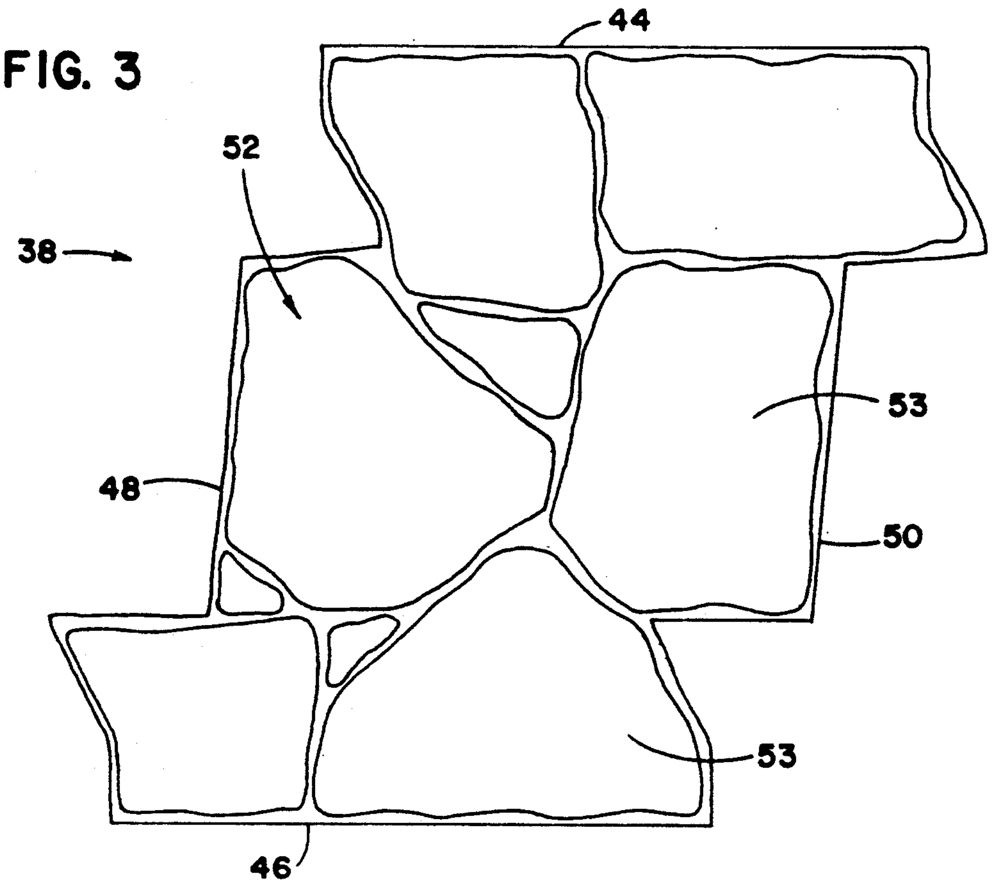
FIG. 3 is a front view of a first embodiment of a form liner.
Figure 4:
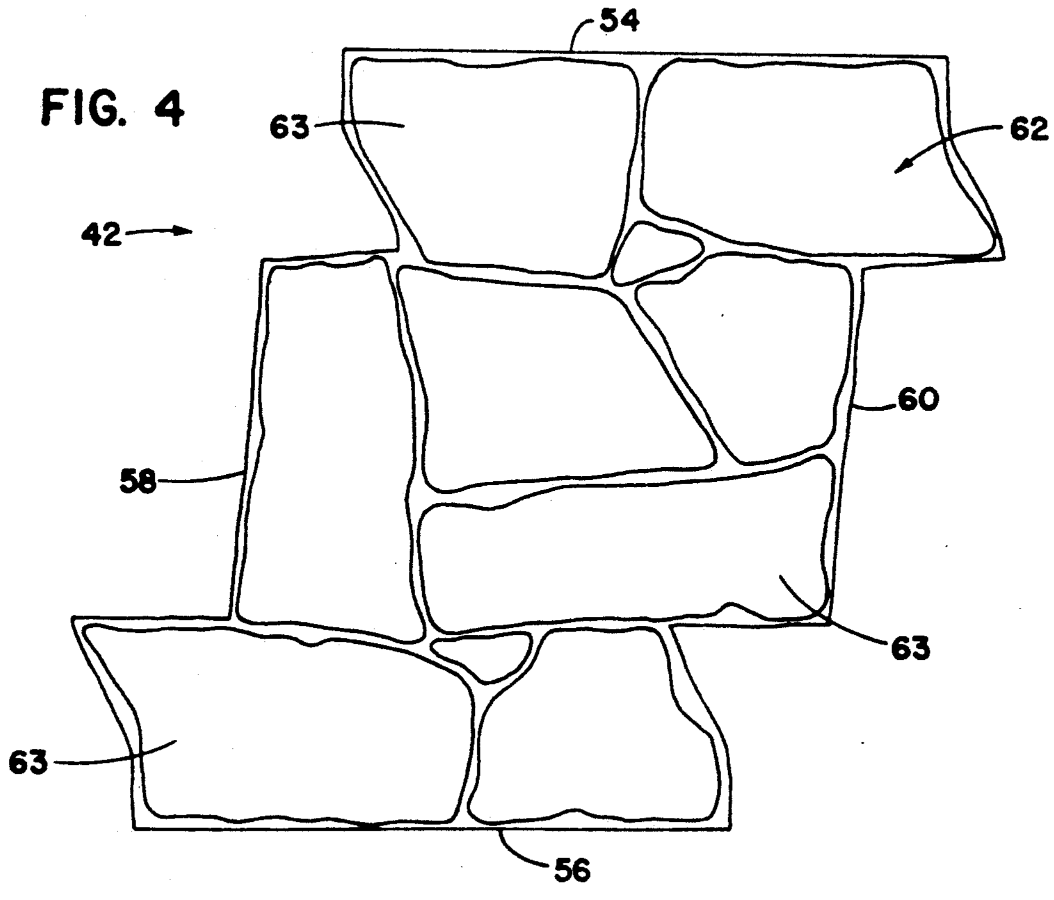
FIG. 4 is a front view of a second embodiment of a form liner.

FIGS. 3–6 illustrate in greater detail a particular application of the method shown generally in FIG. 2 to form a continuous concrete wall 100, as is illustrated in FIG. 6. The wall 100 is formed from integral wall portions of the type shown in FIG. 1 which are formed simultaneously. Referring now to FIGS. 3 and 4, two different form liners, or mold modules, of the type described generally above for use with form 34 are illustrated.

First liner 38, shown in FIG. 3, has a top edge 44 and a bottom edge 46. In the preferred embodiment, the top edge 44 and the bottom edge 46 are parallel to one another. A first non-linear mating edge 48 and a second non-linear mating edge 50 extend from the top edge 44 to the bottom edge 46 on opposite sides of the first liner 38. A lateral relief mold face 52 is surrounded by the top edge 44, bottom edge 46, first non-linear mating edge 48, and second non-linear mating edge 50. The lateral relief mold face 52 comprises a plurality of interlocking contoured relief portions 53 that are adapted to provide a surface on a concrete wall having the contour of a stone wall. Both the pattern and the texture of the lateral relief mold face 52 may be varied to form a concrete wall that resembles a wide variety of different sized and/or textured construction units.

FIG. 4 illustrates a second embodiment of a liner 42 similar to form liner 38. Form liner 42 has a top edge 54 and a bottom edge 56. In the preferred embodiment, the top edge 54 and the bottom edge 56 are parallel to one another, but may also include a non-linear mating edge, such as edges 58, 60 A first non-linear mating edge 58 and a second non-linear mating edge 60 extend from the top edge 54 to the bottom edge 56 on opposite sides of the form liner 42. The edges 58, 60 include a plurality of mating segments that define part of the perimeter of various relief portions 63. In this manner, the edges 58, 60 do not intersect or partition the relief portions (adapted to form individual stones), but instead join at various angles as part of the perimeter of the relief portion. Liner 42 has a lateral relief mold face 62 comprising a plurality of interlocking contoured relief portions 63 that are adapted to provide a surface on a concrete wall having the appearance of a stone wall. The lateral relief mold face 62 shown in FIG. 4 has a different pattern from the form liner 38 shown in FIG. 3. The form liner 42 may also be provided with a wide variety of different textures depending on the type of wall desired. It is to be appreciated that each of the stone-like portions of each form liner could have a variety of different shapes and textures and, further, the arrangement of the stone-like portions could have a variety of different patterns other than the patterns and textures shown.

The form liners shown in FIGS. 3 and 4 are shaped such that the non-linear mating edges interlock with adjacent form liners. For example, the second non-linear mating edge 50 of first liner 38 is adapted to be interlocked with the first non-linear mating edge 58 of the second liner 42 such that when the mating edges are placed in abutting relationship, a continuous lateral relief mold face is provided. Further, the second non-linear mating edge 60 of second liner 42 is adapted to be interlocked with the first non-linear mating edge 48 of the first liner 38 such that when the mating edges are placed in abutting relationship in that manner, a continuous lateral relief mold face is provided. The first form liner 38 and the second form liner 42 are also adapted to be interlocked when one of the form liners is rotated, or inverted 180 degrees in this case, relative to the other about an axis generally perpendicular to the lateral relief mold faces 52, 62. By interlocking a plurality of form liners with different patterns, a concrete wall may be formed wherein a non-repeating pattern to the contours of the interlocking relief portions is not present or is not easily visible.

Referring now to FIG. 5, a gang form mold member, or gang form 68 is shown. The gang form 68 is similarly constructed to the first mold member 10 shown in FIG. 2. The gang form 68 is comprised of a plurality of individual form liners arranged in interlocking relationships. The gang form 68 is used for forming a concrete wall comprised of a plurality of wall portions 14 integrally formed during the same pouring operation. As noted previously, each wall portion 14 could be formed witn a single form liner wherein each wall portion would be formed successively. The method illustrated in FIG. 5, and noted generally by FIG. 2, permits a larger section of wall to be formed in a single pouring operation, thereby providing time and cost savings.

The gang form 68, shown in FIG. 5, is comprised of four form liners **42, 38, 38*a*, 38*b* and two terminal mold modules 72, 74. Form liner 38*a* is identical to form liner 38 and has the same orientation. Form liner 38*b* is identical to form liners 38, 38*a*, but is inverted relative to those two liners. Form liner 42 has a different pattern to form liners 38, 38*a*, 38*b*. The terminal mold modules 72, 74 provide gang form 68 with squared ends. The first terminal mold module 72 has a top edge 76 and a bottom edge 78 which are generally parallel to one another. A terminal edge 82 is generally perpendicular to the top edge 76 and the bottom edge 78. A non-linear mating edge 80 is provided to mate with the first non-linear mating edge 58 of the form liner 42. The second terminal mold module 74 is constructed similarly to the first terminal mold module 72. The gang form 68 shown in FIG. 5 presents a continuous and generally rectangular lateral relief mold face 84**.

FIG. 5 shows the manner in which form liners, designed in accordance with the principle of the present invention, may be interlocked with one another to form the gang form 68. In some applications, only a plurality of identical form liners may be available. In that case, the form liners may be placed in abutting relationship as is shown for example by form liner 38 adjacent to form liner **38*a*. Alternatively, form liners may be provided that permit one or more to be inverted before interlocking as is shown, for example, by inverted form liner 38*b* which has a mating edge which can be interlocked with form liner 38*a*. If a plurality of form liners are provided, some with different patterns, two different form liners may be placed next to each other as is shown for example by form liner 42, which has a different lateral relief mold face from form liner 38, 38*a*, 38*b*. It is to be appreciated that, for any gang form 68, second form liner 42 could also be inverted to provide further variations for the arrangement of the form liners on gang form 68**. Should three form liners or more be available in a particular construction application, even more variation is possible. Using the principles of the present invention, a contoured wall can be formed from a plurality of form liners which are arranged in a manner to give the appearance of a more random and a more natural looking stone wall than would otherwise be possible with a single liner, having either a single orientation or a vertically symmetrical pattern.

FIG. 6 illustrates the resulting concrete wall 100 formed from the gang liner 68 of FIG. 5. The wall 100 has integrally formed wall portions comprising: wall portion 102 formed from liner 42; wall portion 104 formed from form liner 38; wall portion 106 formed from form liner **38*a*; wall portion 108 formed from form liner 38*b*; and first and second terminal wall portions 110, 112 formed from first terminal mold module 72 and second terminal mold module 74**.

In FIG. 5, joints 70 between adjacent form liners are indicated. As noted above, the joints 70 may lead to the formation of seam lines on the wall 100. FIG. 6 illustrates the seam lines 114 that may result. However, in some cases there may be no seam line or a negligible seam line if there is careful placement of the form liners and/or tight engagement of their mating edges. The resulting wall 100 shown in FIG. 6 more naturally resembles a stone wall because any seam lines formed from the joints 70 of the form liners are located in mortar-like portions 114 of the wall 100. As shown in FIG. 6, seam lines 114 from joints 70 do not pass through any of the stone-like portions 116 of the wall 100.

The concrete wall 100 shown in FIG. 6 is a single layer high. It is to be appreciated that a concrete wall may be formed with multiple layers of the type depicted in FIG. 6 that are placed or formed in a vertically stacked relationship. Further, it should be noted that the concrete wall 100 is generally planar but could be configured with various curves or angles. It is even possible to form right angled corners with appropriately structured form liners. Those skilled in the concrete construction art may recognize that, in some applications, concrete reinforcing materials such as steel rods located in an interior of the wall may be necessary depending upon such considerations as the height of the wall, and the environment in which the wall is to exist. Further, in some applications, the wall may be subject to expansion problems and cracking problems. These considerations may require certain modifications to the wall 100 such as periodically inserting spacers between segments of the wall during the construction process.

The form liners 36 of FIG. 2 and form liners 38, 42 illustrated in FIGS. 3 and 4 can be made from a variety of materials including plastics such as vinyl, silicone, polyurethane, and latex. Further, while FIGS. 3 and 4 illustrate only two embodiments of possible contours for the lateral relief mold faces 52, 62, it is to be appreciated that a wide variety of contours could be provided to vary the pattern and/or texture of the lateral relief mold faces. In addition, a wide variety of non-linear mating edges may be utilized. The contoured relief portions of each of the form liners illustrated project from the form liner at varying distances (see FIG. 2, reference a). Typically, the profiles may vary between approximately 2.5 centimeters and 25 centimeters. Preferably, the profiles vary at a distance of at least approximately 2.5 centimeters. More preferably, the profiles vary at least about 5 centimeters.

One method of manufacturing a form liner 36, 38, 42 of the type adapted to be mounted to a form 34 includes providing a master mold which has a master relief surface contour that is the contour of the desired concrete wall portion to be molded from the form liner. It has been found that a master relief surface contour consisting of an actual stone wall often provides a natural looking concrete surface. One technique of forming the form liner 36, 38, 42 with the reciprocal surface of the master relief surface pattern is to first create a mold cavity adjacent the master relief surface contour. Next, hardenable molding material is placed into the mold cavity and permitted to set. It has been found that laminating with polyurethane elastomers and foam works well in some cases to manufacture a form liner from an actual stone wall. The master mold and form liner are separated leaving a form liner having a reciprocal surface to the master relief surface pattern for attachment to the form 34.

Figure 7:
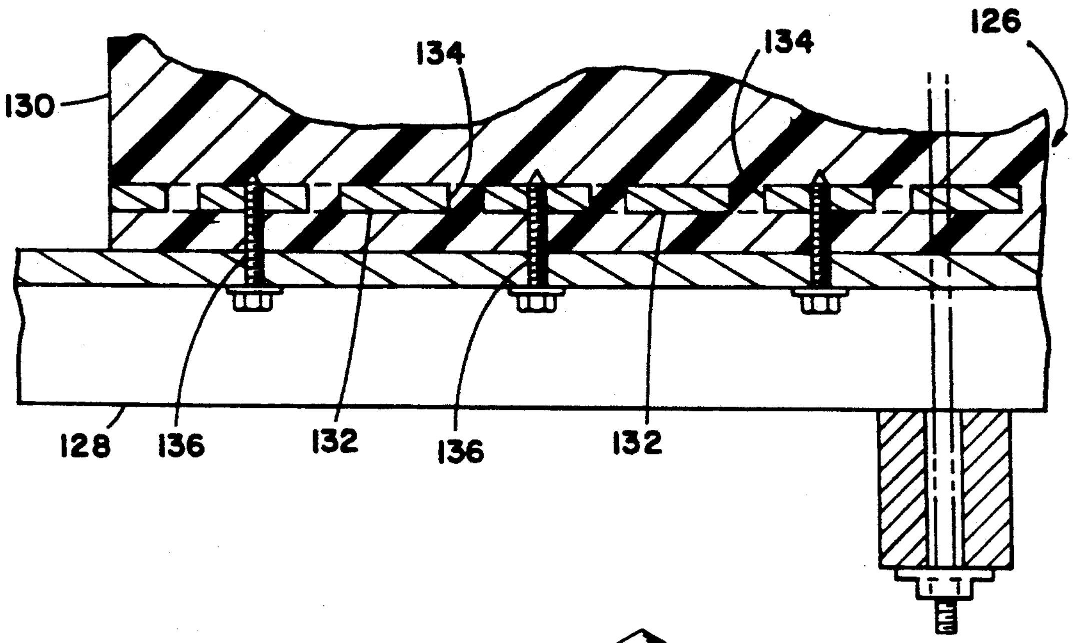
FIG. 7 is a top view in cross-section of alternative embodiment of a form liner and form of the type shown in FIG. 2.

FIG. 7 illustrates an alternative embodiment of a first mold member 126 comprising a form 128 and a form liner 130. The form liner 130 of the alternative embodiment is provided with an internal planar support member 132 adapted to attach the form liner 130 to the form 128. Preferably, the planar support member 132 is made from a material such as wood, for example plywood, for receiving screws 136. The planar support member 132 permits quick and easy attachment of form liner 130 to the form 128. One technique of manufacturing a concrete form liner 130 is to place the planar support member 132 into the hardenable molding material before the molding material has set. Holes 134 can be provided in the planar support member 132 to assist in surrounding the planar support member 132 with hardenable molding material.

It is to be understood, that even though numerous characteristics and advantages of the invention have been set forth in the foregoing description, together with details of the structure and function of the invention, the disclosure is illustrative only, and changes may be made in detail, especially in matters of size, shape, and arrangement of the parts wherein the principles of the invention to the full extent indicated by the broad general meaning of the terms in which the appended claims are expressed.

What is claimed is:

1. A method of forming a first wall having a first exterior surface with a natural stone wall contour including a plurality of nonplanar stone regions surrounded by mortar regions, said method comprising the steps of:

(a) providing first and second mold members, said first mold member including:
   (i) a first non-linear mating edge; and
   (ii) a lateral relief mold face surrounded at least partially by at least a portion of said first non-linear mating edge, said lateral relief mold face including a plurality of interlocking contoured relief portions adapted to provide said natural stone wall contour on said first exterior surface of said first wall, said interlocking contoured relief portions including:
      (A) first surface portions having contours for providing interlocking mortar regions on said first exterior surface; and
      (B) second surface portions having contours for providing non-planar stone regions on said first exterior surface, each of said second surface portions at least partially surrounded by said first surface portions;

(b) securing said first mold member adjacent said second mold member such that said lateral relief mold face faces said second mold member at a distance equal to a desired thickness of said first wall thus creating a first molding cavity between said first and second mold members;

(c) filling said first molding cavity with a hardenable construction material, wherein said interlocking contoured relief portions of said first mold member contour said hardenable construction material to form said first exterior surface including non-planar stone regions surrounded by mortar regions; and (d) allowing said hardenable construction material to set to form said first wall having a first nonlinear mating surface and said first exterior surface having said natural stone wall contour.

2. The method of claim 1, further comprising the steps of:

(a) providing third and fourth mold members, said third mold member including:
   (i) a first non-linear mating edge; and
   (ii) a lateral relief mold face surrounded at least partially by at least a portion of said first non-linear mating edge, said lateral relief mold face including a plurality of interlocking contoured relief portions adapted to provide a natural stone wall contour on a second exterior surface of a second wall, said interlocking contoured relief portions including:
      (A) first surface portions having contours for providing interlocking mortar regions on said second exterior surface; and
      (B) second surface portions having contours for providing non-planar stone regions on said second exterior surface, each of said second surface portions at least partially surrounded by said first surface portions;

(b) securing said third mold member adjacent said fourth mold member such that said lateral relief mold face of said third wall member faces said fourth mold member at a distance equal to a desired thickness of said second wall thus creating a second molding cavity between said third and fourth mold members; and (c) filling said second molding cavity with a hardenable construction material, wherein said interlocking contoured relief portions of said third mold member contour said hardenable construction material to form said second exterior surface including non-planar stone regions surrounded by mortar regions; and (d) allowing said hardenable construction material to set to form said second wall having a second nonlinear mating surface and said second exterior surface having said natural stone wall contour.

3. The method of claim 2, wherein said first wall and said second wall are formed simultaneously and said first non-linear mating surface of said first wall is integrally formed with said second non-linear mating surface of said second wall.

4. The method of claim 2, wherein said first wall and said second wall are formed successively, and before filling said second molding cavity with said hardenable construction material to form said second wall, said first wall is allowed to set and said first non-linear mating edge of said third mold member is mated with said first non-linear mating surface of said first wall.

5. The method of claim 2, wherein said first wall and said second wall are formed separately, and after said first and second walls are allowed to set, said second non-linear mating surface of said second wall is mated with said first nonlinear mating surface of said first wall.

6. The method of claim 1, wherein said first mold member includes a form liner and a form, said form liner having said interlocking contoured relief portions, and said method further comprising the step of attaching said form liner to said form before filling said molding cavity with said hardenable construction material.

7. The method of claim 1, after forming said first wall further comprising the steps of:

positioning said first mold member so that said nonlinear mating edge of said first mold member interlocks with said firs mating surface of said first wall; and repeating steps (b) through (d) of claim 1 to form a second wall.

8. The method of claim 1, wherein said first mold member includes a plurality of mold modules, each of said mold modules including:

(a) a first non-linear mating edge; and (b) a mold face including a portion of said plurality of interlocking contoured lateral relief portions; and said method further including aligning and securing said mold modules to form said first mold member, wherein each mold module has at least a portion of said non-linear mating edge interlocking with a portion of said non-linear mating edge of an adjacent mold module, thereby providing said lateral relief mold face of said first mold member with at least one of said non-linear edges of said mold modules defining said first non-linear mating edge of said first mold member.

9. The method of claim 8, wherein at least two of said plurality of said mold modules have identical mold faces.

10. The method of claim 8, wherein at least two of said mold modules include identical mold faces, with a first mold module being inverted relative to a second identical mold module.

11. The method of claim 8, wherein at least two of said mold modules have different patterns of said portions of said plurality of contoured lateral relief portions on said mold faces.

12. The method of claim 8, wherein said first mold member further includes a pair of terminal mold modules each having:

(a) a top edge and a bottom edge parallel to one another;

(b) a non-linear mating edge; and (c) a terminal edge substantially perpendicular to said top and bottom edges, said terminal mold modules being aligned with said mold modules to form said first mold member having a substantially rectangular shape.

13. The method of claim 1, wherein said hardenable construction material comprises cement.

14. The method of claim 1, further comprising the step of coloring said set construction material with surface coloring pigments.

15. The method of claim 1, wherein said second mold member includes a lateral relief mold face comprising a plurality of interlocking contoured relief portions adapted to provide a natural stone wall contour on a second exterior surface of said first wall.

16. The method of claim 1, wherein said non-linear mating edge includes a plurality of mating segments that define a part of a perimeter of an interlocking contoured relief portion, such that said non-linear mating edge does not partition said interlocking contoured relief portions across said second surface portions for providing said non-planar stone regions.

17. A method of forming a first wall having a first exterior surface with a natural stone wall contour including a plurality of non-planar stone regions surrounded by mortar regions, said method comprising the steps of:

(a) providing a plurality of form liners, each of said form liners including:

(i) first and second non-linear mating edges; and (ii) a lateral relief mold face surrounded at least partially by at least a portion of said first and second non-linear mating edges, said lateral relief mold face including a plurality of interlocking contoured relief portions adapted to provide said natural stone wall contour on said first exterior surface of said first wall, said interlocking contoured relief portions including:

(A) first surface portions having contours for providing interlocking mortar regions on said first exterior surface; and (B) second surface portions having contours for providing non-planar stone regions on said first exterior surface, each of said second surface portions at least partially surrounded by said first surface portions;

(b) securing said plurality of form lines to a form in an adjacent mating relationship to create a first mold member, wherein each form linear has at lest one of said non-linear mating edges interlocking with one of said non-linear mating edges of an adjacent form liner, thereby providing a continuous lateral relief mold face;

(c) providing a second mold member;

(d) securing said first mold member adjacent said second mold member such that said continuous lateral relief mold face faces said second mold member at a distance equal to a desired thickness of said first wall thus creating a first molding cavity between said first and second mold members;

(e) filling said first molding cavity with a hardenable construction material, wherein said interlocking contoured relief portions of said first mold member contour said hardenable construction material to form said first exterior surface including non-planar stone regions surrounded by mortar regoins ;and (f) allowing said hardenable construction material to set to form said first wall having said first exterior surface having said natural stone wall contour.

18. The method of claim 17, wherein at least two of said form liners having identical lateral relief mold faces.

19. The method of claim 17, wherein at least two of said form liners include identical lateral relief mold faces, with a first form liner inverted relative to a second identical form liner.

20. The method of claim 19, wherein at lest two of said form liners have different patterns of said interlocking contoured relief portions on said lateral relief mold faces.

21. The method of claim 17, wherein at least three of said form liners are provided, with at lest two of said form liners having different patterns of said interlocking contoured relief portions on said lateral relief mold faces.

* * * * *

UNITED STATES PATENT AND TRADEMARK OFFICE
CERTIFICATE OF CORRECTION

PATENT NO. : 5,232,646

DATED : August 3, 1993

INVENTOR(S) : Nasvik et al.

It is certified that error appears in the above-identified patent and that said Letters Patent is hereby corrected as shown below:

Claim 7, col. 11, line 41, delete "firs" and insert --first--.

Claim 17, column 12, line 55, DELETE "lines" and INSERT --liners--.

Claim 17, column 12, line 57, DELETE "linear" and INSERT --liner--.

Claim 17, column 12, line 57, DELETE "lest" and INSERT --least--.

Claim 18, column 13, line 12, delete "having" and insert --have--.

Claim 20, column 14, line 5, DELETE "lest" and INSERT --least--.

Claim 21, column 14, line 10, DELETE "lest" and INSERT --least--.

Signed and Sealed this

Fifth Day of July, 1994

*Attest:*

BRUCE LEHMAN

*Attesting Officer* *Commissioner of Patents and Trademarks*

UNITED STATES PATENT AND TRADEMARK OFFICE
CERTIFICATE OF CORRECTION

PATENT NO. : B1 5,232,646

DATED : February 16, 1999

INVENTOR(S) : Nasvik et al.

It is certified that error appears in the above-identified patent and that said Letters Patent is hereby corrected as shown below:

On the cover page, Section [73] Reexamination Certificate for:, the issue date should read —Aug. 3, 1993—.

Claim 1, column 1, line 25, "a first]" should read —[a first]—;

Claim 1, column 1, line 60, "members" should read —member—.

Claim 1, column 2, line 29, insert —mold— after the word "fourth".

Claim 17, column 2, line 65, "linear" should read —liner—.

Claim 17, column 3, line 14, "eac" should read —each—.

Claim 17, column 3, line 21, "linears" should read —liners—.

Claim 17, column 3, line 23, "linear" should read —liner—.

Claim 23, column 4, line 25, "linears" should read —liners—.

Signed and Sealed this

Fifteenth Day of June, 1999

*Attest:*

Q. TODD DICKINSON

*Attesting Officer* — *Acting Commissioner of Patents and Trademarks*

US005232646B1

REEXAMINATION CERTIFICATE (3733rd)

United States Patent [19]

[11] B1 5,232,646

Nasvik et al.

[45] Certificate Issued Feb. 16, 1999

[54] METHODS OF FORMING CONTOURED WALLS

[75] Inventors: Peter A. Nasvik, West St. Paul, Minn.; Paul C. Nasvik, Hudson, Wis.

[73] Assignee: Concrete Design Specialties, Inc., St. Paul, Minn.

Reexamination Request:
No. 90/004,625, May 8, 1997

Reexamination Certificate for:

Patent No.: 5,232,646
Issued: Aug. 13, 1993
Appl. No.: 611,179
Filed: Nov. 7, 1990

Certificate of Correction issued Jul. 5, 1994.

[51] Int. Cl.$^6$ .............................. B28B 1/16; B28B 11/06; B29C 39/12; E04B 1/16

[52] U.S. Cl. .............................. 264/133; 249/16; 249/35; 249/55; 249/99; 249/102; 249/104; 249/112; 249/140; 264/33; 264/34; 264/35; 264/131; 264/219; 264/225; 264/245; 264/254; 264/255; 264/256; 264/259; 264/316; 264/338

[58] Field of Search ................................ 264/133, 33, 34, 264/35, 131, 219, 225, 245, 254, 255, 256, 259, 316, 338, 313, 31, 32; 249/16, 55, 99, 102, 104, 112, 140, 35

[56] References Cited

U.S. PATENT DOCUMENTS

| | | |
|---|---|---|
| Re. 29,945 | 3/1979 | Scott . |
| D. 247,148 | 2/1978 | Dicks et al. . |
| D. 282,623 | 2/1986 | Nasvik . |
| 748,352 | 12/1903 | Dexter . |
| 787,665 | 4/1905 | Deeds et al. . |
| 827,712 | 8/1906 | Daniel . |
| 836,368 | 11/1906 | Dexter . |
| 859,704 | 7/1907 | Stevens . |
| 969,248 | 9/1910 | Davis et al. . |

(List continued on next page.)

FOREIGN PATENT DOCUMENTS

| | | | |
|---|---|---|---|
| 450070 | 7/1948 | Canada | 249/140 |
| 997482 | 9/1976 | Canada . | |
| 1101365 | 10/1955 | France | 249/16 |
| 2214802 | 1/1973 | France . | |
| 2489737 | 9/1980 | France . | |

(List continued on next page.)

OTHER PUBLICATIONS

Document entitled, "Elastik–Formen Fur Strukturbeton," RECKLI®—Verfahren, 3 pages, labelled Exhibit A1, and 5 pages of English translation, labelled Exhibit A2.

Fitzgerald Construction Sales, Inc., catalog, entitled, "Fitzgerald Formliners," 8 pages, copyright 1986, labelled Exhibit B.

Fitzgerald Construction Sales, Inc., literature, entitled "Architectural Concrete Design–at lower cost," Schal–plast, Fiberglass Reinforced Flexible Formliners, and Fiberlyte, 4 pages, copyright 1985, labelled Exhibit C.

(List continued on next page.)

*Primary Examiner*—Karen Aftergut

[57] ABSTRACT

The present invention is a contoured wall and method for creating the contour and appearance of a wall formed from individual assembled units such as stones. The wall is formed from a plurality of interlocking wall portions that each have at least two non-linear mating surfaces. Each of the wall portions further has a lateral face contoured to resemble the stone wall. The wall is formed from hardenable construction material such as concrete poured between two mold members. Each of the mold members has a lateral mold face with at least one of the lateral faces having a plurality of interlocking contoured relief portions to provide a molded surface having the contour of a stone wall. In one embodiment, at least one of the mold members includes a plurality of individual form liners, or mold modules, each of which includes two non-linear mating edges and a lateral relief mold face.

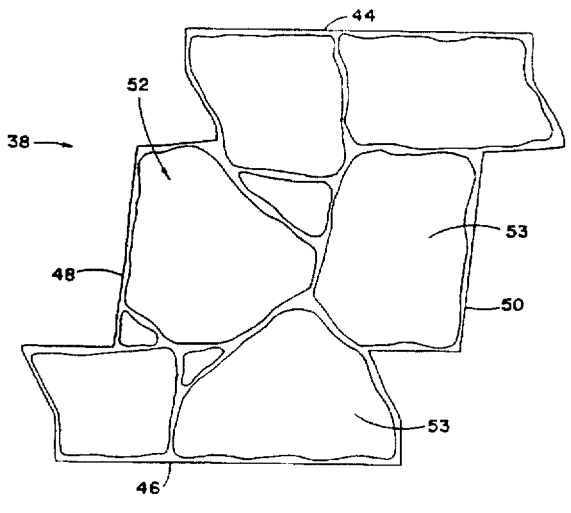

U.S. PATENT DOCUMENTS

| | | | |
|---|---|---|---|
| 1,479,647 | 1/1924 | Carroll . | |
| 1,491,205 | 4/1924 | Ford . | |
| 1,564,578 | 12/1925 | Kennedy . | |
| 1,636,396 | 7/1927 | Urschel | 249/39 |
| 1,712,678 | 5/1929 | Redman | 249/16 |
| 1,776,999 | 9/1930 | Jensen . | |
| 1,809,504 | 6/1931 | Carvel . | |
| 1,937,306 | 11/1933 | Barriball . | |
| 2,130,911 | 9/1938 | Teunon . | |
| 2,246,377 | 6/1941 | Mattes . | |
| 2,270,809 | 1/1942 | Kaye . | |
| 2,323,299 | 7/1943 | Craig . | |
| 2,355,967 | 8/1944 | Greenwalt . | |
| 2,474,654 | 6/1949 | Carlson | 264/256 |
| 2,513,648 | 7/1950 | Iezzi . | |
| 2,517,432 | 8/1950 | Hornberger . | |
| 2,616,145 | 11/1952 | Dufford . | |
| 2,629,135 | 2/1953 | Johnson | 249/140 |
| 2,689,381 | 9/1954 | Terriere | 249/140 |
| 3,002,322 | 10/1961 | Dorsett | 249/16 |
| 3,177,279 | 4/1965 | Bilodeau | 264/255 |
| 3,307,822 | 3/1967 | Stout . | |
| 3,334,570 | 8/1967 | Marson . | |
| 3,515,779 | 6/1970 | Jones . | |
| 3,524,790 | 8/1970 | Mason . | |
| 3,566,572 | 3/1971 | Wilkinson | 264/35 |
| 3,584,088 | 6/1971 | Williams . | |
| 3,584,826 | 6/1971 | Liester | 249/35 |
| 3,602,476 | 8/1971 | Iragorri . | |
| 3,621,625 | 11/1971 | Medow . | |
| 3,678,887 | 7/1972 | Smith . | |
| 3,689,626 | 9/1972 | Scott . | |
| 3,692,458 | 9/1972 | Kirsch . | |
| 3,702,180 | 11/1972 | Jones . | |
| 3,768,266 | 10/1973 | Glenn . | |
| 3,795,721 | 3/1974 | Gilbert et al. . | |
| 3,817,289 | 6/1974 | Coffman . | |
| 3,820,936 | 6/1974 | Kirsch . | |
| 3,844,527 | 10/1974 | Scott . | |
| 3,874,140 | 4/1975 | Seehusen . | |
| 3,950,477 | 4/1976 | Di Giacomo | 264/254 |
| 3,954,377 | 5/1976 | Scholz et al. | 249/112 |
| 3,968,610 | 7/1976 | Medow . | |
| 4,116,415 | 9/1978 | Ward . | |
| 4,131,406 | 12/1978 | Fresquez | 404/93 |
| 4,135,840 | 1/1979 | Puccini et al. | 404/93 |
| 4,150,808 | 4/1979 | Sawyer . | |
| 4,159,097 | 6/1979 | Strickland . | |
| 4,239,176 | 12/1980 | Salazar . | |
| 4,239,820 | 12/1980 | Salvador . | |
| 4,241,554 | 12/1980 | Infantino . | |
| 4,267,221 | 5/1981 | Ishikawa . | |
| 4,275,540 | 6/1981 | Keller . | |
| 4,290,248 | 9/1981 | Kemerer et al. . | |
| 4,407,480 | 10/1983 | Trimmer et al. . | |
| 4,419,133 | 12/1983 | Shubow et al. . | |
| 4,478,821 | 10/1984 | Carrillo . | |
| 4,555,088 | 11/1985 | Chang . | |
| 4,559,881 | 12/1985 | Lankard et al. . | |
| 4,590,726 | 5/1986 | Salazar . | |
| 4,627,764 | 12/1986 | Scheiwiller . | |
| 4,656,722 | 4/1987 | Armstrong . | |
| 4,665,673 | 5/1987 | Diana . | |
| 4,750,703 | 6/1988 | Gentilcore et al. . | |
| 4,769,191 | 9/1988 | Diana . | |
| 4,794,821 | 1/1989 | Geng . | |
| 4,811,537 | 3/1989 | D'Epenoux . | |
| 4,840,004 | 6/1989 | Ting . | |
| 4,887,789 | 12/1989 | Harris et al. . | |
| 4,944,124 | 7/1990 | Armstrong . | |
| 4,977,731 | 12/1990 | Grainger . | |
| 5,002,817 | 3/1991 | Jones . | |

FOREIGN PATENT DOCUMENTS

| | | | |
|---|---|---|---|
| 2496141 | 12/1980 | France . | |
| 24 08 425 | 9/1975 | Germany . | |
| 24 49 398 | 4/1976 | Germany . | |
| 25 57 632 | 6/1977 | Germany . | |
| 31 35 979 | 3/1983 | Germany . | |
| 53-23331 | 7/1978 | Japan . | |
| 158825 | 9/1984 | Japan | 249/16 |
| 1-174768 | 7/1989 | Japan . | |
| 214662 | 8/1989 | Japan | 249/16 |
| 1558069 | 12/1979 | United Kingdom . | |

OTHER PUBLICATIONS

Labrado Forms, Inc. document, entitled "Architectural Concrete," copyright 1985, 6 pages.

Article entitled "Concrete Form Construction", pp. 47–76, labelled Exhibit AA.

Brochure entitled "Custom Rock Creations", 4 pages, labelled Exhibit BB, May 1988.

A Reinfoced Earth Company brochure, entitled, "Family of Construction Technologies", 8 pages copyright 1990, labelled Exhibit A, 1990.

A Reinforced Earth Company brochure, entitled "an Advanced Construction Technology", 8 pages, copyright 1990, labelled Exhibit B, 1990.

A Reinforced Earth Company document, entitled "Standard and Custom Finishes Mak Reinforced Earth Structures Attractive as Well as Functional", 1 page, copyright 1989, labelled Exhibit C, 1989.

Bomanite Corporation brochure, entitled "The Network For Concrete Innovation", 4 pages labelled Exhibit A, 1989.

Bomanite Corporation brochure, entitled "Bomacron Patterns", Bomanite Patterns, and Bomanite Guideline Specification, 4 pages, labelled Exhibit B, 1989.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 2–5, and 7 are cancelled.

Claims 1,16, and 17 are determined to be patentable as amended.

Claims 6, 8–15, and 18–21, dependent on an amended claim, are determined to be patentable.

New claims 22–24 are added and determined to be patentable.

1. A method of forming a [first] wall having a first] *an* exterior surface with a natural stone wall contour including a plurality of nonplanar stone regions surrounded by mortar regions, said method comprising the steps of:

(a) providing first and second mold members, said first mold member including:

(i) a first non-linear mating edge *adapted to be interlocked with a reciprocal non-linear mating edge of a third mold member*; [and]

*(ii) a second non-linear mating edge adapted to be interlocked with said reciprocal non-linear mating edge of said third mold member*;

*(iii)* [(ii)] a lateral relief mold face surrounded at least partially by at least a portion of said first *and second* non-linear mating *edges* [edge], said lateral relief mold face including a plurality of interlocking contoured relief portions adapted to provide said natural stone wall contour on said [first] exterior surface of said [first] wall, *said interlocking contoured relief portions defining irregular and non-repeating patterns of natural stones*, said interlocking contoured relief portions including:

(A) first surface portions having contours for providing interlocking mortar regions on said [first] exterior surface; and (B) second surface portions having contours for providing non-planar stone regions on said [first] exterior surface, each of said second surface portions at least partially surrounded by said first surface portions; *and*

*(iv) said first and second non-linear mating edges of said lateral relief mold face defined by said first surface portions having contours for providing interlocking mortar regions on said first exterior surface;*

*(b) providing third and fourth mold members, said third mold members including:*

*(i) a first non-linear mating edge adapted to be interlocked with said first non-linear mating edge of said first mold member and adapted to be interlocked with said second non-linear mating edge of said first mold member; and*

*(ii) a lateral relief mold face surrounded at least partially by at least a portion of said first non-linear mating edge, said lateral relief mold face including a plurality of interlocking contoured relief portions adapted to provide a natural stone wall contour on said exterior surface of said wall, said interlocking contoured relief portions defining irregular and non-repeating patterns of natural stones, said interlocking contoured relief portions including:*

*(A) first surface portions having contours for providing interlocking mortar regions on said exterior surface; and*

*(B) second surface portions having contours for providing non-planar stone regions on said exterior surface, each of said second surface portions at least partially surrounded by said first surface portions; and*

*(iii) said first and second non-linear mating edges of said lateral relief mold face defined by said first surface portions having contours for providing interlocking mortar regions on said exterior surface;*

[(b)]*(c) securing said first mold member adjacent said second mold member such that said lateral relief mold face faces said second mold member at a distance equal to a desired thickness of said wall thus creating a first molding cavity between said first and second mold members;*

*(d) securing said third mold member adjacent said fourth mold member such that said lateral relief mold face of said third mold member faces said fourth mold member at a distance equal to a desired thickness of said wall thus creating a second molding cavity between said third and fourth members;*

*(e) selecting one of said first and second non-linear mating edges of said first mold member for mating with said non-linear mating edge of said third mold member;*

*(f) mating said selected non-linear mating edge of said first mold member with said non-linear mating edge of said third mold member;*

[(c)]*(g)* filling said first *and second* molding [cavity] *cavities* with a hardenable construction material, wherein said interlocking contoured relief portions of said first *and third* mold [member] *members* contour said hardenable construction material to form said [first] exterior surface including non-planar stone regions surrounded by mortar regions, and

[(d)] *(h)* allowing said hardenable construction material to set to form said [first] wall having [a] first *and second* nonlinear mating [surface] *surfaces integrally formed with each other* and said [first] exterior surface having said natural stone wall contour.

16. The method of claim 1, wherein said non-linear mating [edge includes] *edges include* a plurality of mating segments that define a part of a perimeter of an interlocking contoured relief portion, such that said non-linear mating [edge does] *edges do* not partition said interlocking contoured relief portions across said second surface portions for providing said non-planar stone regions.

17. A method of forming a first wall having a first exterior surface with a natural stone wall contour including a plurality of non-planar stone regions surrounded by mortar regions, said method comprising the steps of:

(a) providing a plurality of form liners, each of said form liners including:

(i) first and second non-linear mating edges, *each adapted to be interlocked with a reciprocal non-linear mating edge of a reciprocal form linear*; and (ii) a lateral relief mold face surrounded at least partially by at least a portion of said first and second non-linear mating edges, said lateral relief mold face including a plurality of interlocking contoured relief portions adapted to provide said natural stone wall contour on said first exterior surface of said first wall, *said interlocking contoured relief portions defining irregular and non-repeating patterns of natural stones*, said interlocking contoured relief portions including:

(A) first surface portions having contours for providing interlocking mortar regions on said first exterior surface; and (B) second surface portions having contours for providing non-planar stone regions on said first exterior surface, eac of said second surface portions at least partially surrounded by said first surface portions;

*(iii) said first and second non-linear mating edges of said lateral relief mold face defined by said first surface portions having contours adapted to form interlocking mortar regions on said first exterior surface;*

(b) securing said plurality of form linears to a form *such that a selected one of said first and second non-linear mating edges of a first form linear of said plurality of form liners is* in an adjacent mating relationship *with a selected non-linear mating edge of a second form liner* to create a first mold member, wherein each form liner has at least one of said non-linear mating edges interlocking with one of said non-linear mating edges of an adjacent form liner, thereby providing a continuous lateral relief mold face;

(c) providing a second mold member;

(d) securing said first mold member adjacent said second mold member such that said continuous lateral relief mold face faces said second mold member at a distance equal to a desired thickness of said first wall thus creating a first molding cavity between said first and second mold members;

(e) filling said first molding cavity with a hardenable construction material, wherein said interlocking contoured relief portions of said first mold member contour said hardenable construction material to form said first exterior surface including non-planar stone regions surrounded by mortar regions; and (f) allowing said hardenable construction material to set to form said first wall having said first exterior surface having said natural stone wall contour.

*22. The method of claim 11, further comprising the step of reusing said two mold moldules having different patterns in a different mating configuration.*

*23. The method of claim 17, wherein said form has a planar surface facing said form liners, and wherein said form liners each have a planar surface facing said planar surface of said form and facing in an opposite direction to said lateral relief mold face, and wherein said non-linear mating edges of said form linears each includes a plurality of planar segments, at least some of which intersect one another at non-perpendicular angles.*

*24. The method of claim 20, further comprising the step of reusing said two form liners having different patterns in a different mating configuration.*

* * * * *